US009774645B2

United States Patent
Wang et al.

(10) Patent No.: US 9,774,645 B2
(45) Date of Patent: Sep. 26, 2017

(54) BASIC SERVICE SET LOAD MANAGEMENT

(71) Applicant: MEDIATEK Singapore Pte. Ltd., Singapore (SG)

(72) Inventors: Chao-Chun Wang, Taipei (TW); Gabor Bajko, Santa Clara, CA (US); Chih-Shi Yee, Hsinchu County (TW); Ching-Hwa Yu, Tainan (TW); Rongsheng Huang, Fremont, CA (US)

(73) Assignee: MEDIATEK SINGAPORE, Singapore (SG)

( * ) Notice: Subject to any disclaimer, the term of this patent is extended or adjusted under 35 U.S.C. 154(b) by 167 days.

(21) Appl. No.: 14/738,079

(22) Filed: Jun. 12, 2015

(65) Prior Publication Data

US 2015/0365952 A1 Dec. 17, 2015

Related U.S. Application Data

(60) Provisional application No. 62/011,853, filed on Jun. 13, 2014.

(51) Int. Cl.
*H04L 29/06* (2006.01)
*H04W 72/12* (2009.01)

(52) U.S. Cl.
CPC ..... *H04L 65/4076* (2013.01); *H04W 72/1252* (2013.01)

(58) Field of Classification Search
CPC ................ H04L 65/4076; H04W 72/1252
See application file for complete search history.

(56) References Cited

U.S. PATENT DOCUMENTS

| 8,024,441 | B2 | 9/2011 | Kommula et al. | 709/223 |
|---|---|---|---|---|
| 8,412,829 | B2 | 4/2013 | Keller et al. | 709/227 |
| 2004/0068668 | A1* | 4/2004 | Lor | H04L 63/107 726/15 |
| 2013/0272164 | A1* | 10/2013 | Leonardos | H04W 12/04 370/254 |
| 2014/0105051 | A1* | 4/2014 | Toner | H04W 24/08 370/252 |
| 2015/0133081 | A1* | 5/2015 | Griot | H04L 12/1435 455/407 |
| 2015/0208444 | A1* | 7/2015 | Park | H04W 74/0808 370/329 |
| 2015/0244601 | A1* | 8/2015 | Wentink | H04L 43/04 370/253 |

OTHER PUBLICATIONS

International Search Report and Written Opinion of International Search Authority for PCT/SG2015/050158 dated Sep. 24, 2015(11 pages).

* cited by examiner

*Primary Examiner* — Ajay Cattungal
(74) *Attorney, Agent, or Firm* — Imperium Patent Works; Zheng Jin; Helen Mao

(57) ABSTRACT

A method of managing BSS network loading is proposed. An access point (AP) transmits BSS session time and data limit element in beacon or probe response frame or a response frame to a service request frame. The AP determines the session time and data limit according to the network load and AP resourced. The AP adjusts the session time and data limit dynamically. An STA decides whether to join a specific BSS based on the BSS session time and the BSS session data limit. AP encourages or discourages the STA to join the BSS by increasing or reducing the session time and data limit. The per-AP loading will be distributed according to AP's capabilities.

22 Claims, 4 Drawing Sheets

BASIC SERVICE SET LOAD MANAGEMENT

CROSS REFERENCE TO RELATED APPLICATIONS

This application claims priority under 35 U.S.C. §119 from U.S. Provisional Application No. 62/011,853, entitled "BSS Load Management," filed on Jun. 13, 2014, the subject matter of which is incorporated herein by reference.

TECHNICAL FIELD

The disclosed embodiments relate generally to wireless network communications, and, more particularly, to Basic Service Set (BSS) load management in wireless communications systems.

BACKGROUND

IEEE 802.11 is a set of media access control (MAC) and physical layer (PHY) specification for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11n is an amendment that improves upon the previous IEEE 802.11 standards by adding multiple-input multiple-output antennas (MIMO). IEEE 802.11ac is an amendment to IEEE 802.11 that builds on 802.11n. Changes compared to 802.11n include wider channels (80 or 160 MHz versus 40 MHz) in the 5 GHz band, more spatial streams (up to eight versus four), higher-order modulation (up to 256-QAM vs. 64-QAM), and the addition of Multi-user MIMO (MU-MIMO). IEEE 802.11ad is an amendment that defines a new physical layer for 802.11 networks to operate in the 60 GHz millimeter wave spectrum. This frequency band has significantly different propagation characteristics than the 2.4 GHz and 5 GHz bands where Wi-Fi networks operate. IEEE 802.11ah defines a WLAN system operating at sub 1 GHz license-exempt bands. 802.11ah can provide improved transmission range compared with the conventional 802.11 WLANs operating in the 2.4 GHz and 5 GHz bands. 802.11ah can be used for various purposes including large-scale sensor networks, extended range hotspot, and outdoor Wi-Fi for cellular traffic offloading, whereas the available bandwidth is relatively narrow. IEEE 802.11ax is the successor to 802.11ac; it will increase the efficiency of WLAN networks. IEEE 802.11ax is currently at a very early stage of development and has the goal of providing 4× the throughput of 802.11ac.

Beacon frame is one of the management frames in IEEE 802.11-based WLANs. Beacon frame contains all the necessary information about the network. Beacon frames are transmitted periodically to announce the presence of a wireless LAN. Beacon frames are transmitted by an Access Point (AP) that manages an infrastructure Basic Service Set (BSS). Beacon frames consist of MAC header, Frame body and FCS. Typical fields include timestamp, beacon interval, capability information, SSID, supported rates, and other parameter sets. The AP can manage the network loading of the BSS by broadcasting the following information: channel load information, BSS load information, BSS available admission capacity, BSS average access delay, and extended BSS load element.

A wireless station (STA) uses the above information to select the best AP among all the reachable APs to join a specific WLAN or BSS. Studies show that in a dense environment, an STA joins a BSS only for a few minutes. Due to bursty user application behavior, about 10% of the STAs will leave a BSS less than two minutes after association. The departing STAs trigger Group Temporal Key (GTK) handshake. Further, less than 30% of STAs will stay in a BSS over 60 minutes. Under such dense environment with bursty user application behavior, a solution is sought for effective BSS load management.

SUMMARY

A method of managing basic service set (BSS) network loading is proposed. An access point (AP) transmits BSS session time and data limit element in beacon frame, a probe response frame, or a response frame to a service request frame. The AP determines the BSS session time and data limit according to the network load and AP resource. The AP adjusts the session time and data limit dynamically. An STA decides whether to join a specific BSS based on the BSS session time and the data limit. AP encourages or discourages the STA to join the BSS by increasing or reducing the BSS session time and data limit. The per-AP loading will be distributed according to each AP's capabilities.

In one embodiment, a first station (an access point AP) broadcasts a management frame in a wireless communications network (a basic service set BSS). The management frame comprises a BSS session time and a BSS session data limit. The AP accepts a request from a second station (non-AP STA) to join the BSS. The AP establishes a session and provide a connectivity service to the second STA upon session establishment. The session expires when a service time exceeds the BSS session time or when a data amount consumed by the second STA exceeds the BSS session data limit. The session is terminated or extended by the AP upon session expiration. The AP adjusts the session time and data limit according to the network load and AP resource. The per-AP loading will be distributed according to AP's capabilities.

In another embodiment, a second station (non-AP STA) receives a broadcasted management frame in a wireless communications network (BSS) managed by a first station (AP). The management frame comprises a BSS session time and a BSS session data limit. The STA sends a request to the AP to join the BSS. The STA establishes a session with the AP and thereby receiving a connectivity service. The session expires when a service time exceeds the BSS session time or when a data amount consumed by the second STA exceeds the BSS session data limit. The session is terminated or extended by the AP upon session expiration. The STA decides whether to join a specific BSS based on the session time and data limit. AP encourages or discourages STA to join the BSS by increasing or reducing the session time and data limit. The per-AP loading is distributed according to AP's capabilities.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
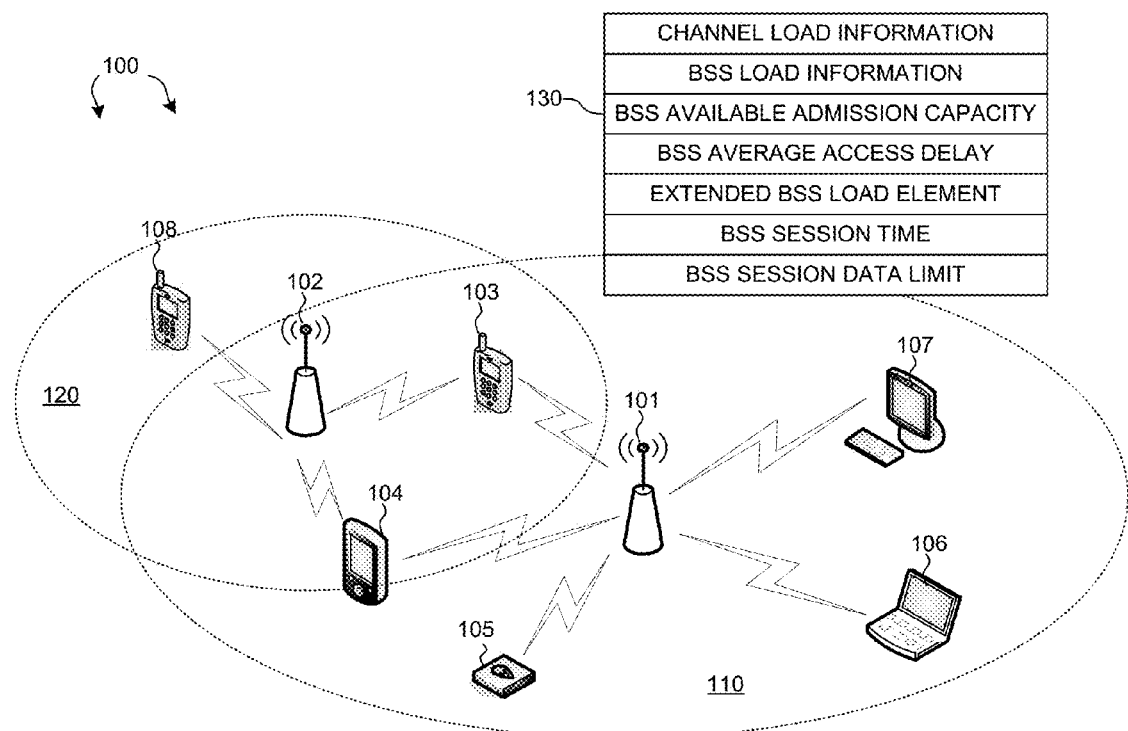
FIG. 1 illustrates a management frame broadcasted by access points in a wireless communications system in accordance with one novel aspect.

FIG. 1 illustrates a management frame 130 broadcasted by access points AP 101 and AP 102 in a wireless communications system 100 in accordance with one novel aspect. Wireless communications system 100 comprises a first WLAN 110 managed by AP 101 and a second WLAN 120 managed by AP 102. WLAN 110 or WLAN 120 is also referred to as a Basic Service Set (BSS). A service set is a set consisting of all the devices associated with an IEEE 802.11 wireless local area network (WLAN). The basic service set (BSS) provides the basic building block of an IEEE 802.11 WLAN. In infrastructure mode, an access point (AP) together with all associated stations (STAs) is called a BSS. The wireless AP is a station (AP STA) that allows other wireless stations (non-AP STAs) to connection to a wired network using Wi-Fi or related standards. The AP acts as a master to control the STAs within the BSS. In the example of FIG. 1, AP 101 manages BSS 110 having STA 103, 104, 105, 106, and 107, and AP 102 manages BSS 120 having STA 103, 104, and 108. Because AP 101 and AP 102 are both reachable for STA 103 and STA 104, the STAs can select the best AP to join.

Beacon frame is one of the management frames in IEEE 802.11-based WLANs. Beacon frames are transmitted periodically to announce the presence of a wireless LAN. Beacon frames are transmitted by an AP that manages a BSS. Beacon frames consist of MAC header, Frame body and FCS. Typical fields include timestamp, beacon interval, capability information, SSID, supported rates, and other parameter sets. The AP can manage the network loading of the BSS by broadcasting the following information: channel load information, BSS load information, BSS available admission capacity, BSS average access delay, and extended BSS load element. An STA uses the above information to select the best AP among all the reachable APs to join a specific WLAN or BSS. Under a dense environment with bursty user application behavior, however, the above information is not sufficient for the AP to effectively manage the BSS loading.

In one novel aspect, AP 101 or AP 102 broadcasts management frame 130 for BSS load management. The management frame 130 may be a beacon frame or a probe response frame or a response frame to a service request frame. Management 130 comprises additional management elements—a BSS session time and a BSS session data limit for AP to effectively manage its BSS loading. The BSS session time indicates the maximum service time of a station joining the BSS upon session establishment, and the BSS data limit indicates the maximum data amount consumed by a station during each active session. If the station has received connectivity service for a duration that exceeds the session time, then the session expires and the AP can either terminate the session or extend the session. Similarly, if the station has transmitted and received data in an amount that exceeds the session data limit, then the session also expires regardless of whether the service duration has exceeded the session time or not. The AP can determine the BSS session time and the session data limit according to the network load and the available AP resource. The AP can also adjust the BSS session time and the session data limit dynamically. From STA perspective, each STA can decide whether to join a BSS based on the BSS session and data limit information and its own requirement. As a result, BSS loading is distributed according to AP capability.

Figure 2:
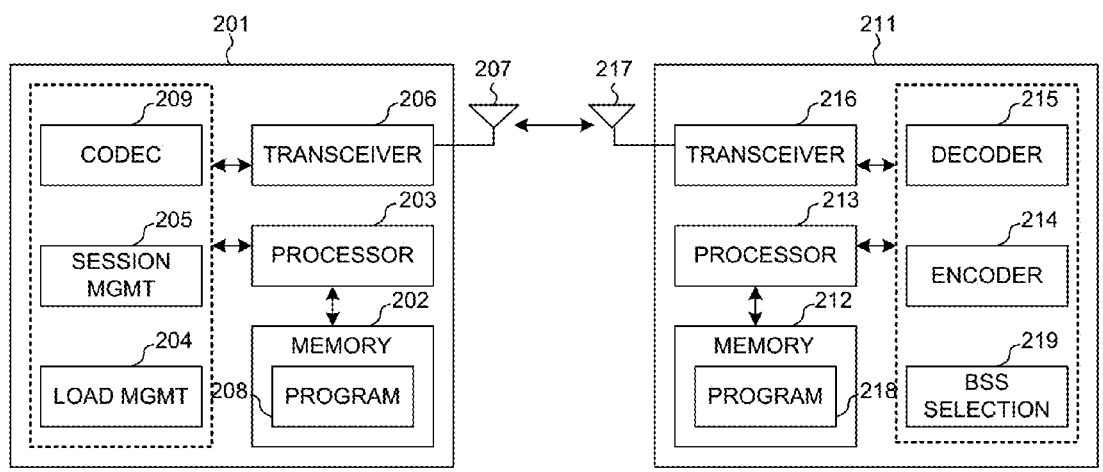
FIG. 2 is a simplified block diagram of a wireless transmitting device and a receiving device in accordance with one novel aspect.

FIG. 2 is a simplified block diagram of wireless devices 201 (AP) and 211 (non-AP STA) in accordance with a novel aspect. For wireless device 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in wireless device 201. Memory 202 stores program instructions and data 208 to control the operations of the wireless device.

Similar configuration exists in wireless device 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in wireless device 211. Memory 212 stores program instructions and data 218 to control the operations of the wireless device.

The wireless devices 201 and 211 also include several functional modules to carry out some embodiments of the present invention. The different functional modules can be implemented by software, firmware, hardware, or any combination thereof. The function modules, when executed by the processors 203 and 213 (e.g., via executing program codes 208 and 218), for example, allow device 201 to encode and transmit a bit stream to device 211 via encoder 209, and allow device 211 to receive and decode the bit stream accordingly via decoder 215. Encoder modules convert original information from one format to another, while decoder modules reverse the operation of the encoders so that the original information can be retrieved. In one example, at the AP side, AP 201 monitors its loading information via load management module 204, determines session parameters via session management module 205, and broadcasts beacon frames to STAs. At the non-AP STA side, STA 211 receives the broadcasted beacon frames from multiple APs and selects a corresponding BSS that is best suitable to join.

Figure 3:
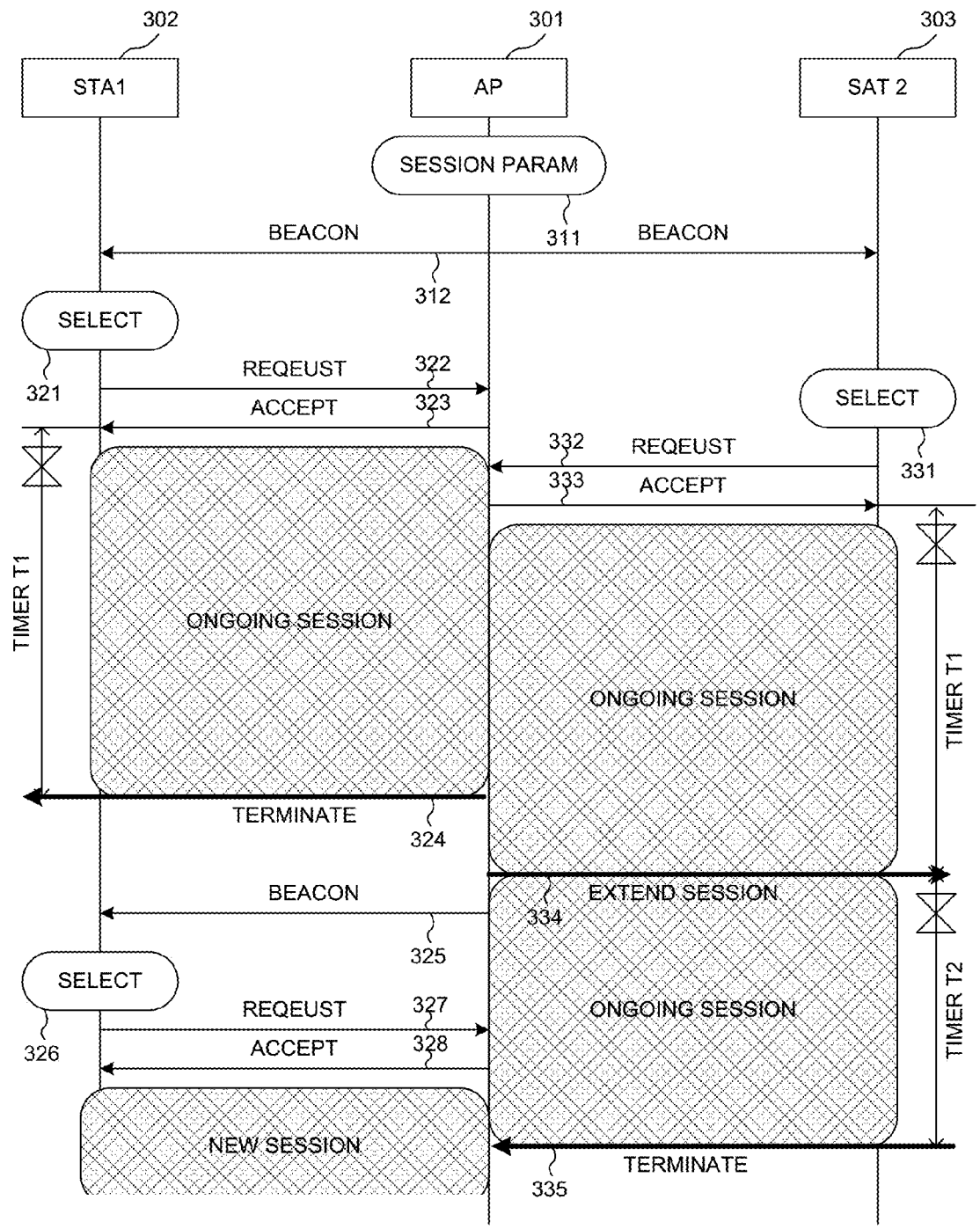
FIG. 3 is a signaling diagram between an access point (AP STA) and two stations (non-AP STAs) with additional network management elements.

FIG. 3 is a signaling diagram between an access point (AP STA) and two stations (non-AP STAs) with additional network management elements. In step 311, AP 301 determines the session parameters including a session time and a session data limit. The session parameters are determined based on the currently network loading of the BSS managed by AP 301. For example, if the current network loading is 50%, then AP 301 may determine to provide longer session time and higher data limit to newly joined STAs. If the current network loading is 80%, then AP 301 may determine to provide shorter session time and lower data limit to newly joined STAs. However, session parameters may also depend on the network environment and the number of STAs to be supported by the AP. For example, in a sparse environment, there are not too many STAs waiting for joining the BSS, so the AP can provide longer session time and higher data limit for each STA. On the other hand, in a dense environment, there are many STAs waiting for joining the BSS, so the AP can provide shorter session time and lower data limit for each STA. The AP can support tiered service for STAs with different priorities. For example, STAs with higher priority may be served with longer session time and higher data limit, while STAs with lower priority may be served with shorter session time and lower data limit.

After determining the session parameters, in step 312, AP 301 broadcasts beacon frames to STA1 and STA2. In step 321, STA1 selects to join the BSS managed by AP 301 if STA1 is satisfied with the session time and the session data limit provided by AP 301 (e.g., session time=T1, and session data limit=100 Mbytes). In step 322, STA1 sends a request to AP 301 to join the BSS. In step 323, AP 301 accepts the request and establishes an active ongoing session with STA1. For example, AP 301 starts a timer with duration T1 to keep track of the service time for STA1. Later, when the provided connectivity service exceeds duration T1, then the timer expires and the session expires accordingly. In step 324, AP 301 then terminates the session with STA1. AP 301 may disassociate with STA1 after the session expires. Alternatively, if STA1 has consumed more data amount than the session data limit, then the session also expires even if the service duration has not exceeded the session time.

If STA1 wishes to continue the WiFi service provided by AP 301, then STA1 has to request for a new session. In step 325, STA1 receives updated beacon frames broadcasted from AP 301. Note that AP 301 can adjust the session parameters dynamically and broadcast adjusted session time and session data limit via the updated beacon frames. AP 301 can also inform the current network loading to the STAs via the updated beacon frames. In step 326, STA1 again selects to join the BSS managed by AP 301 if STA1 is satisfied with the updated session time and the updated session data limit provided by AP 301. In step 327, STA1 sends a second request to AP 301 to join the BSS. In step 328, AP 301 accepts the request and establishes a new session with STA1.

Similar to STA1, in step 331, STA2 selects to join the BSS managed by AP 301 if STA2 is satisfied with the session time and the session data limit provided by AP 301 (e.g., session time=T1, and session data limit=100 Mbytes). In step 332, STA1 sends a request to AP 301 to join the BSS. In step 333, AP 301 accepts the request and establishes an active ongoing session with STA2. For example, AP 301 starts a timer with duration T1 to keep track of the service time for STA2. Later, when the provided connectivity service exceeds duration T1, then the timer expires and the session expires accordingly. Alternatively, if STA2 has consumed more data amount than the session data limit of 100 Mbytes, then the session also expires even if the service duration has not exceeded the session time T1.

Instead of terminate the ongoing session upon its expiry, AP 301 may choose to extend the session. For example, in step 334, AP 301 sends a message to STA2 to extend the session with a predefined session time and a predefined session data limit. The session is then extended for an extended duration and an extended data amount. For example, AP 301 starts a timer with duration T2 to keep track of the service time for STA2. Later, when the provided connectivity service exceeds duration T2, then the timer expires and the session expires accordingly. Alternatively, if STA2 has consumed more data amount than the extended session data limit, then the session also expires even if the service duration has not exceeded the extended session time T2.

Figure 4:
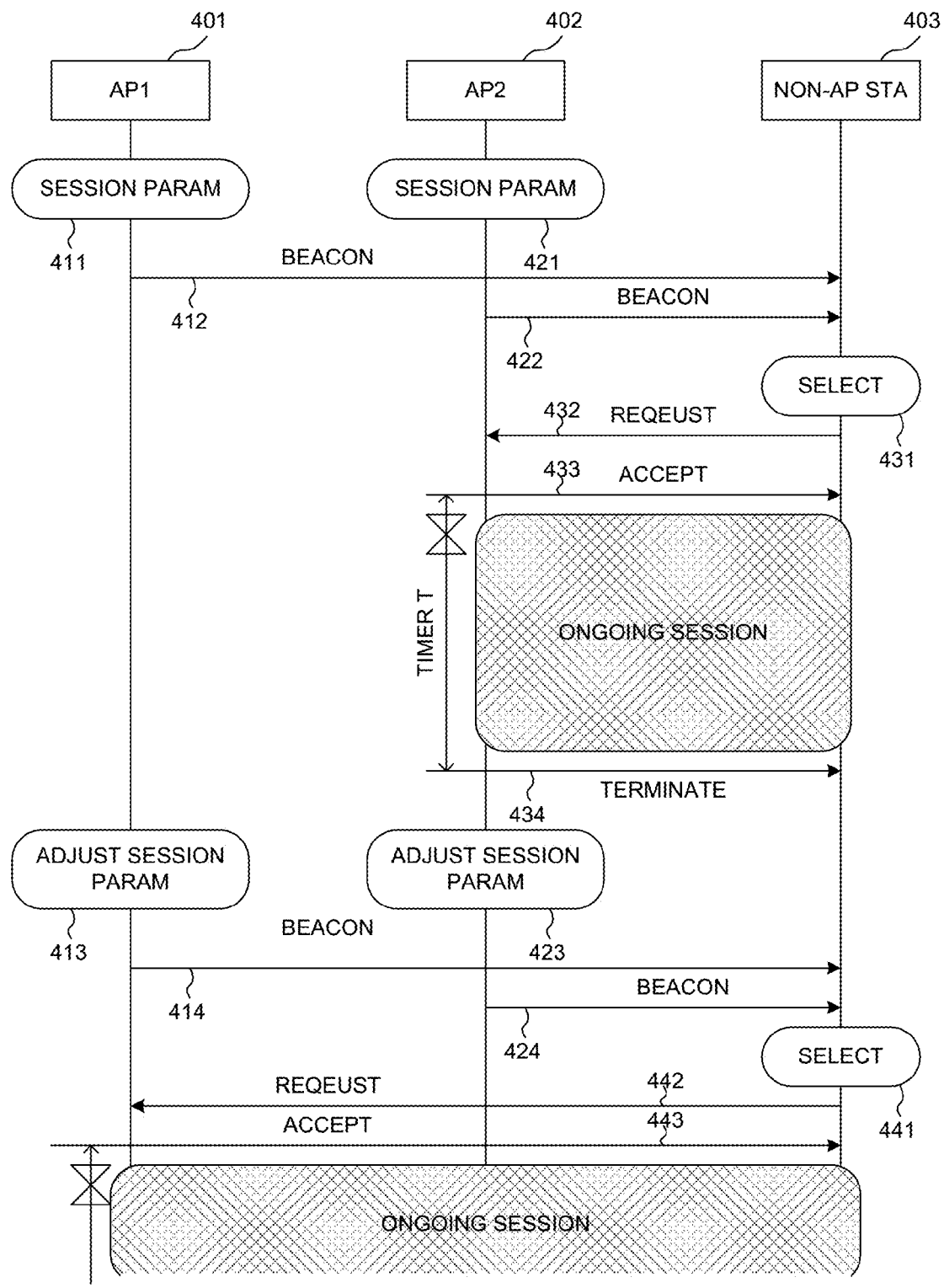
FIG. 4 is a signaling diagram between two access points (AP STAs) and one station (non-AP STA) with additional network management elements.

FIG. 4 is a signaling diagram between two access points (AP STAs) and one station (non-AP STA) with additional network management elements. In step 411, AP 401 determines the session parameters including a session time and a session data limit. In step 421, AP 402 determines the session parameters including a session time and a session data limit. The session parameters are determined based on the currently network loading of the BSS managed by AP 401 and AP 402, respectively. For example, if the current network loading for AP 401 is <50%, then AP 401 may determine to provide longer session time and higher data limit to newly joined STAs. If the current network loading for AP 402 is ~80%, then AP 402 may determine to provide shorter session time and lower data limit to newly joined STAs. However, session parameters may also depend on the network environment and the number of STAs to be supported by the APs. For example, if AP 402 is in a sparse environment with less STAs waiting for joining the BSS, the AP 402 can provide longer session time and higher data limit for each STA even though its network loading is approaching 80%. On the other hand, if AP 401 is in a dense environment with many STAs waiting for joining the BSS, the AP 401 may provide shorter session time and lower data limit for each STA even though its network loading is less than 50%.

After determining the session parameters, in step 412, AP 401 broadcasts beacon frames to STA 403. In step 422, AP 402 broadcast beacon frames to STA 403. In step 431, STA 403 selects to join the BSS managed by AP 402 if STA 403 is satisfied with the session time and the session data limit provided by AP 404. Naturally, STAs will select the one supporting the longest session time and data limit. Sometimes, however, STAs will consider both parameters jointly and decide which BSS best fits their needs. For example, suppose the session time and session data limit provided by AP 401 is one hour and 100 Mbytes, and the session time and session data limit provided by AP 402 is 30 minutes and 200 Mbytes. If STA 403 only needs wireless service for less than 30 minutes but with a data amount of more than 100 Mbytes, then STA 403 selects to join the BSS managed by AP 402. The STA may determine which BSS to join by considering additional information carried by the beacon frames including: channel load information, BSS load information, BSS available admission capacity, BSS average access delay, and extended BSS load element. Further, the STA may also consider other information such as the cost of the service. For example, the STA may choose a free service with shorter session time and lower data limit as compared to a charged service with longer session time and higher data limit.

After BSS selection, in step 432, STA 403 sends a request to AP 402 to join the BSS. In step 433, AP 402 accepts the request and establishes an active ongoing session with STA 403. In one example, AP 402 starts a timer with duration T (the session time of 30 minutes) to keep track of the service time for STA 403. Later, when the provided connectivity service exceeds duration T, then the timer expires and the session expires accordingly. In step 434, AP 402 then terminates the session with STA 403. AP 402 may disassociate with STA 403 after the session expires. Alternatively, if STA 403 has consumed more data amount than the session data limit (e.g., 200 Mbytes), then the session also expires even if the service duration has not exceeded the session time.

At any time, the AP can dynamically adjusts its session parameters and broadcasts the updated session parameters via beacon frames. For example, the AP increases or reduces the BSS session time and data limit according to the number of associated STAs and available resources. If the network loading is high, the AP can discourage STAs to join the BSS by reducing the BSS session time and data limit. For example, for APs with high loading, they can reduce the BSS session time and data limit to be less than the highest supporting values. On the other hand, for APs with low loading, they can increase the BSS session time and data limit to be more than the highest supporting values. As a result, per-AP loading will be distributed according to each AP's capabilities and network scenario.

In step 413, AP 401 determines its adjusted session parameters. In step 423, AP 402 determines its adjusted session parameters. In step 414, AP 401 broadcasts beacon frames with updated session time and data limit. In step 424, SP 402 broadcasts beacon frames with updated session time and data limit. In step 441, STA 403 selects a BSS to join based on the received session parameters and other information carried in the beacon frames. For example, this time STA 403 selects to join the BSS managed by AP 401 because AP 401 provides longer session time, which is desired by STA 403. In step 442, STA 403 sends a request to AP 401 to join the BSS. In step 443, AP 401 accepts the request and establishes an active ongoing session with STA 403 and provides service to STA 403.

Figure 5:
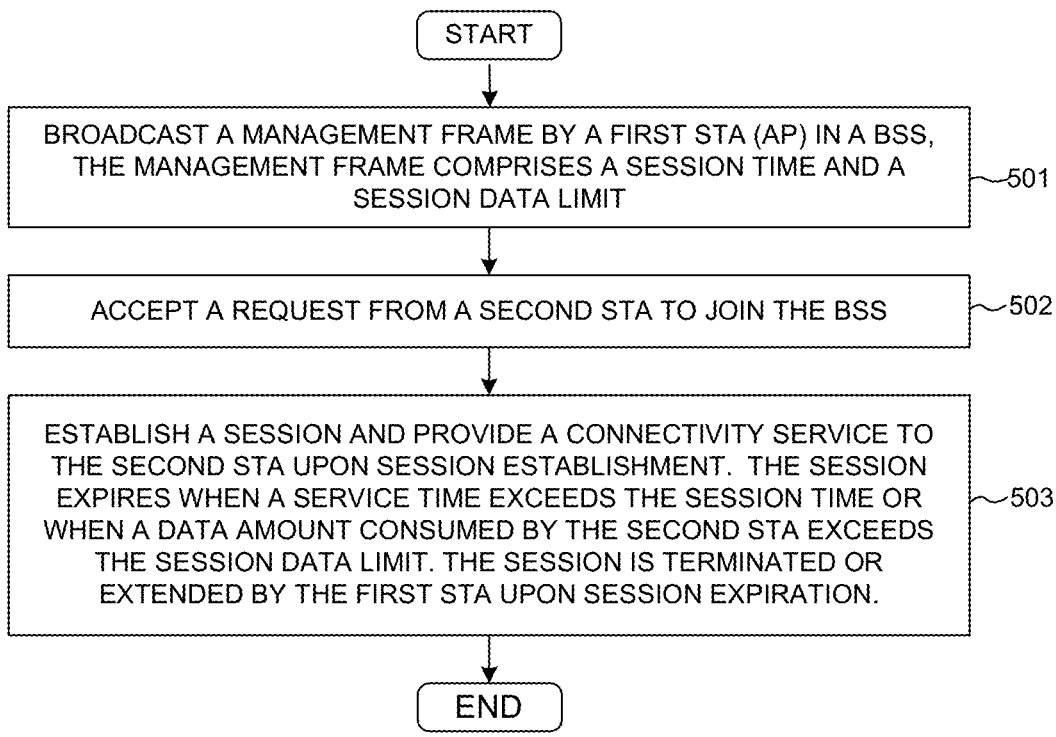
FIG. 5 is flow chart of a method of BSS load and session management from AP perspective in accordance with a novel aspect.

FIG. 5 is flow chart of a method of BSS load and session management from AP perspective in accordance with a novel aspect. In step 501, a first station (an access point AP) broadcasts a management frame in a wireless communications network (a basic service set BSS). The management frame comprises a BSS session time and a BSS session data limit. In step 502, the AP accepts a request from a second station (non-AP STA) to join the BSS. In step 503, the AP establishes a session and provide a connectivity service to the second STA upon session establishment. The session expires when a service time exceeds the BSS session time or when a data amount consumed by the second STA exceeds the BSS session data limit. The session is terminated or extended by the AP upon session expiration. The AP adjusts the session time and data limit dynamically according to the network load and AP resource. The per-AP loading will be distributed according to AP's capabilities.

Figure 6:
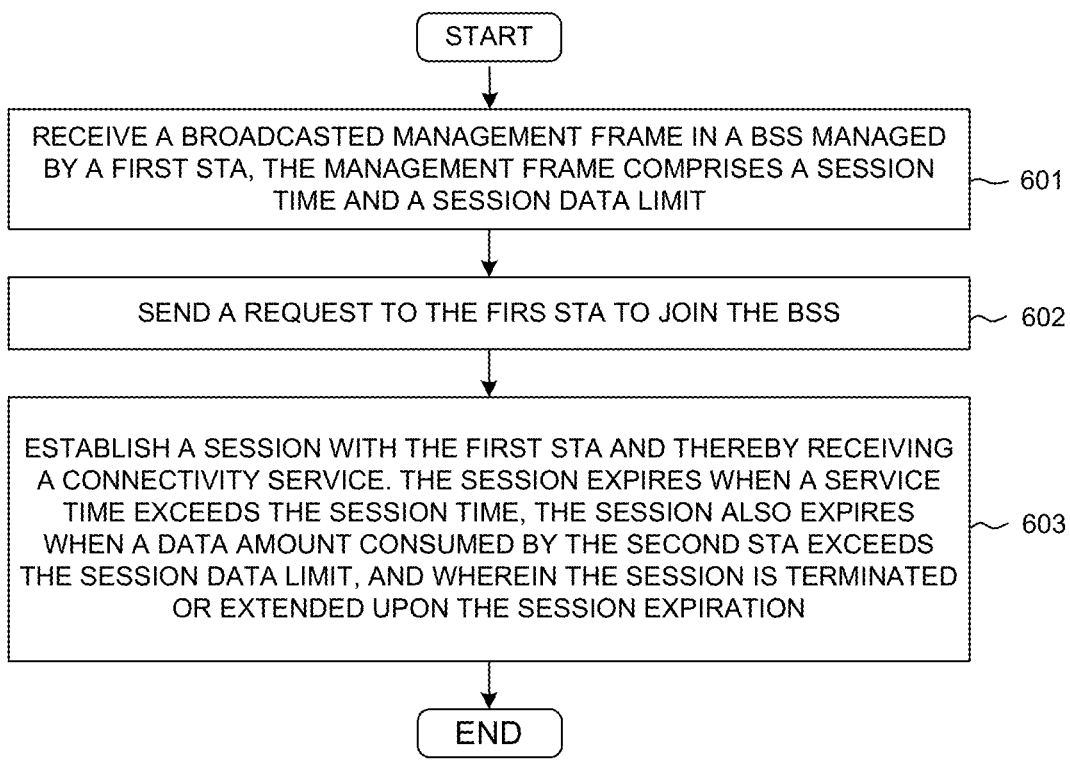
FIG. 6 is a flow chart of a method of BSS load and session management from STA perspective in accordance with a novel aspect.

FIG. 6 is a flow chart of a method of BSS load and session management from STA perspective in accordance with a novel aspect. In step 601, a second station (non-AP STA) receives a broadcasted management frame in a wireless communications network (BSS) managed by a first station (AP). The management frame comprises a BSS session time and a BSS session data limit. In step 602, the STA sends a request to the AP to join the BSS. In step 603, the STA establishes a session with the AP and thereby receiving a connectivity service. The session expires when a service time exceeds the BSS session time or when a data amount consumed by the second STA exceeds the BSS session data limit. The session is terminated or extended by the AP upon session expiration. The STA decides whether to join a specific BSS based on the BSS session time and the BSS session data limit. AP encourages or discourages STA to join the BSS by increasing or reducing the session time and data limit. The per-AP loading will be distributed according to AP's capabilities.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   broadcasting a management frame by a first station (STA) that manages a wireless communications network, wherein the management frame comprises a session time and a session data limit, wherein the session time indicates the maximum service time of a station joining the first STA upon session establishment, and the data limit indicates the maximum data amount consumed by a station during each active session;
   accepting a request from a second STA to join the wireless communications network; and
   establishing a session with the second STA and thereby providing a connectivity service to the second STA, wherein the session expires when a service time exceeds the session time, wherein the session also expires when a data amount consumed by the second STA exceeds the session data limit, and wherein the session is terminated or extended by the first STA upon the session expiration.

2. The method of claim 1, wherein the management frame is a beacon frame, a probe response frame, or a response frame for a service request frame.

3. The method of claim 1, wherein the first STA adjusts the session time and the data limit based on a number of associated STAs and the current loading.

4. The method of claim 3, wherein the first STA reduces the session time and/or the data limit to discourage STAs from jointing the network.

5. The method of claim 1, wherein the first STA informs the second STA a current loading of the wireless communications network.

6. The method of claim 1, wherein the first STA terminates the session with the second STA upon the session expires.

7. The method of claim 1, wherein the first STA disassociates with the second STA upon the session expires.

8. The method of claim 1, wherein first STA extends the session by a predetermined time and a predetermined data limit upon the session expires.

9. A first station (STA) comprising:
   a transmitter that broadcasts a management frame in a wireless communications network, wherein the management frame comprises a session time and a session data limit, and wherein the session time indicates the maximum service time of a station joining the first STA upon session establishment, and the data limit indicates the maximum data amount consumed by a station during each active session;
   a receiver that accepts a request from a second STA to join the wireless communications network managed by the first STA; and
   a session management module that establishes a session with the second STA and provides a connectivity service to the second STA, wherein the session expires when a service time exceeds the session time, wherein the session also expires when a data amount consumed by the second STA exceeds the session data limit, and wherein the session is terminated or extended by the first STA upon the session expiration.

10. The first STA of claim 9, wherein the management frame is a beacon frame, a probe response frame, or a response frame for a service request frame.

11. The first STA of claim 9, wherein the first STA adjusts the session time and the data limit based on a number of associated STAs and the current loading.

12. The first STA of claim 11, wherein the first STA reduces the session time and/or the data limit to discourage STAs from jointing the network.

13. The first STA of claim 9, wherein the first STA informs the second STA a current loading of the wireless communications network.

14. The first STA of claim 9, wherein the first STA terminates the session with the second STA upon the session expires.

15. The first STA of claim 9, wherein the first STA disassociates with the second STA upon the session expires.

16. The first STA of claim 9, wherein first STA extends the session by a predetermined time and a predetermined data limit upon the session expires.

17. A method comprising:
receiving a broadcasted management frame from a first station (STA) by a second STA in a wireless communications network, wherein the management frame comprises a session time and a session data limit, wherein the session time indicates the maximum service time of a station joining the first STA upon session establishment, and the data limit indicates the maximum data amount consumed by a station during each active session;
sending a request to the first STA to join the wireless communications network managed by the first STA;
establishing a session with the first STA and thereby receiving a connectivity service from the first STA, wherein the session expires when a service time exceeds the session time, wherein the session also expires when a data amount consumed by the second STA exceeds the session data limit, and wherein the session is terminated or extended upon the session expiration.

18. The method of claim 17, wherein the management frame is a beacon frame, a probe response frame, or a response frame for a service request frame.

19. The method of claim 17, wherein the second STA receives multiple management frames from multiple stations, and wherein the second STA selects which network to join based on the session time and the data limit.

20. The method of claim 19, wherein the second STA selects a network that supports the longest session time or the highest data limit.

21. The method of claim 17, wherein the session is terminated and the second STA requests to establish a new session with the first STA.

22. The method of claim 17, wherein the session is extended by a predetermined time and a predetermined data limit upon the session expires.

* * * * *

UNITED STATES PATENT AND TRADEMARK OFFICE
CERTIFICATE OF CORRECTION

PATENT NO. : 9,774,645 B2
APPLICATION NO. : 14/738079
DATED : September 26, 2017
INVENTOR(S) : Chao-Chun Wang et al.

It is certified that error appears in the above-identified patent and that said Letters Patent is hereby corrected as shown below:

On the Title Page

Left Column, (73) Assignee: should now read:
"MEDIATEK SINGAPORE PTE. LTD."

In the Claims

Column 8, Line 40, the word "jointing" should be "joining"

Column 9, Line 12, the word "jointing" should be "joining"

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*